Aug. 13, 1940.  D. A. SALVETTI  2,211,388
UNIVERSAL JOINT
Filed Oct. 21, 1939  2 Sheets-Sheet 2
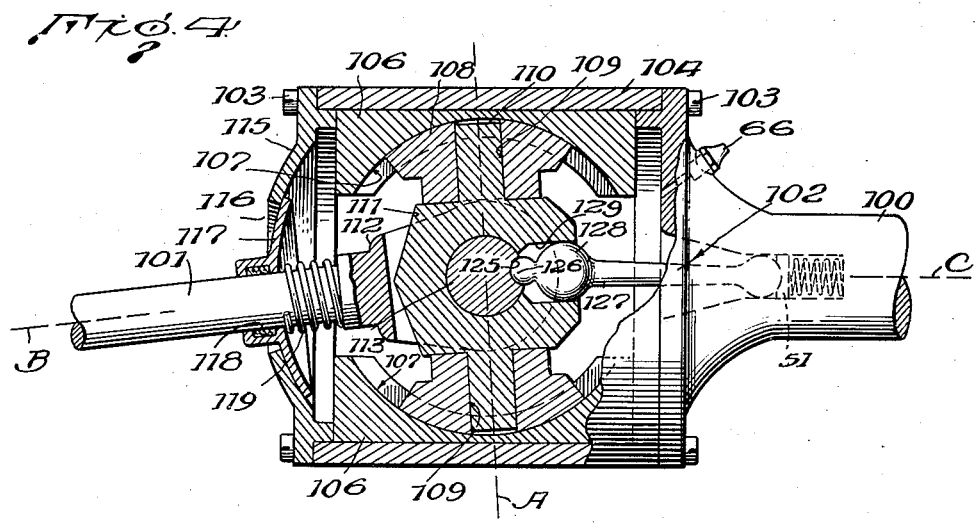
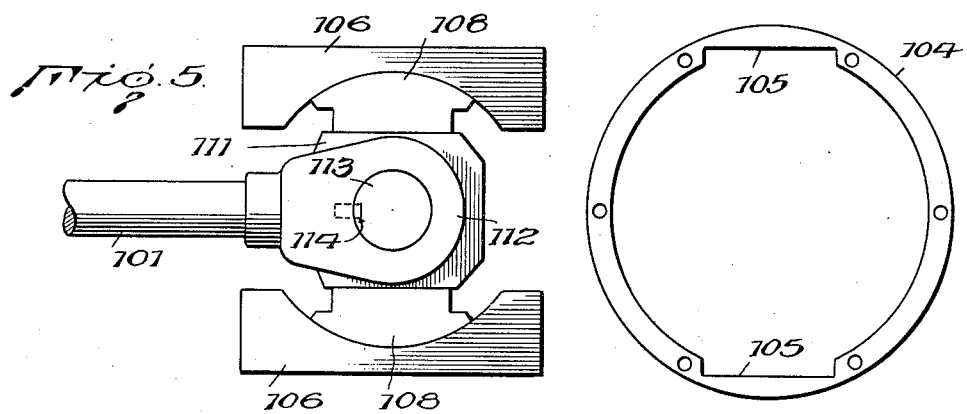
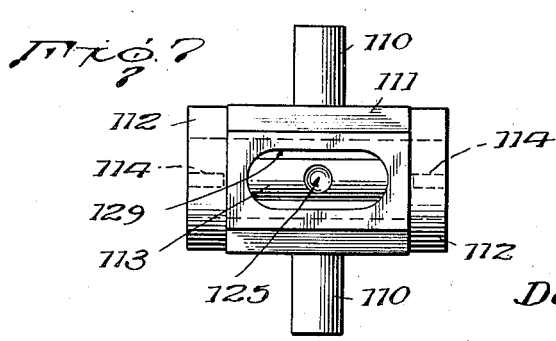
Inventor
Dante A. Salvetti,
By A. M. Houghton
His Attorney Patented Aug. 13, 1940

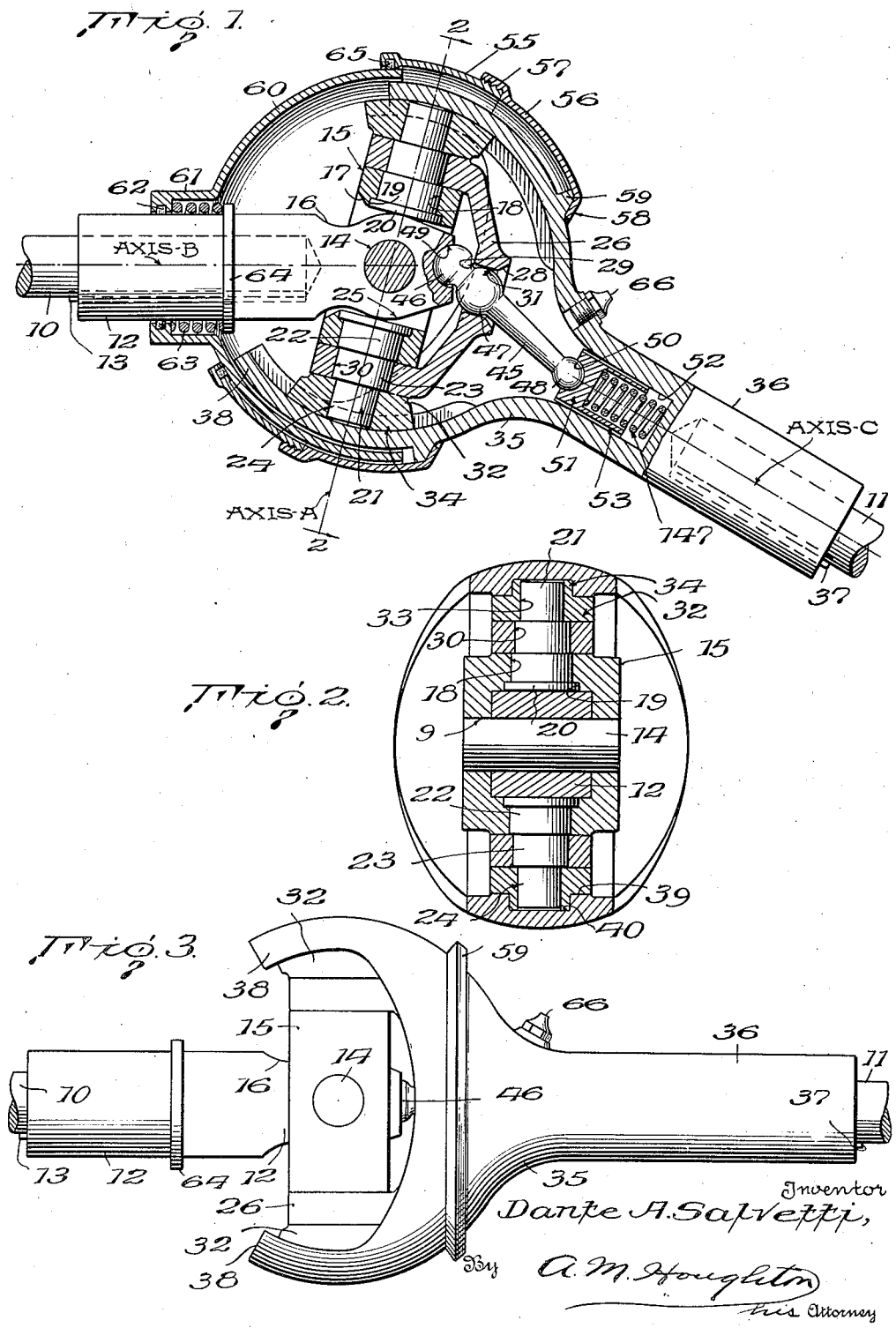

2,211,388

UNITED STATES PATENT OFFICE 2,211,388

UNIVERSAL JOINT

Dante A. Salvetti, Blawnox, Pa., assignor of one-third to William G. Darrall, Springdale, Pa.

Application October 21, 1939, Serial No. 300,664

7 Claims. (Cl. 64—21)

This invention or discovery relates to universal joints, and more particularly to an improved universal joint of the constant velocity ratio type.

In many machines there is the problem of transmitting rotary motion from a driving shaft to a driven shaft which may be disposed permanently out of alinement with the driving shaft, or which may swing through a varying angle with respect to the driving shaft. The ordinary form of universal joint known as Hooke's joint is a simple and dependable device for transmitting motion under such conditions. It has however the inherent disadvantage that, assuming the angular velocity (speed of rotation) of the driving shaft to be constant, the angular velocity of the driven shaft is not constant except when the two shafts are perfectly alined. At other positions than perfect alinement, the angular velocity of the driven shaft has two maxima and two minima during each revolution.

Where it is necessary to avoid this variable velocity ratio effect with Hooke's joints, two joints have been used in tandem, disposed in a certain angular relation with respect to each other, and special supporting means provided to maintain the required relation. This makes a clumsy and inconvenient mechanism. In some machines, such as in the wheel driving mechanism of front-wheel-drive automobiles, the bulk of conventional double Hooke's joints is particularly disadvantageous, and efforts have been made to devise more compact constant velocity ratio joints, with varying degrees of success. But most of the compact constant velocity joints that are practical at all, suffer from undue delicacy and from difficulties in manufacture and repair. Some types use balls, which not only involve very high bearing pressures but also are liable to breakage. This may be a disastrous matter if the joint is one of the front wheel joints of a racing car for instance.

One object of the present invention is the provision of a universal joint of a modified double Hooke's joint type, which affords a constant annular velocity ratio between the two sides of the joint, over a wide angular range, but which preserves much of the simplicity and reliability of an ordinary single Hooke's joint.

Another object is the provision of a compact universal joint of the constant velocity ratio type, in which all the parts thereof which work under load are, or can be, of simple cylindrical contour, affording wide bearing surfaces and at the same time being easily tooled and machined in manufacture.

Another object is the provision of a joint of the character described in which the only parts that move relative to each other under load at any given position of the driving and driven shafts are, or can be, simple cylindrical shafts and bearings.

Another object is the provision of such a joint in which the parts are so constructed and arranged that change of shaft angularity takes place with a minimum of friction.

Another object is the provision of a joint of simple and open construction, at once light in weight and readily accessible for lubrication and repair, and readily taken down into its component parts.

Another object is the provision of a constant velocity ratio joint of simple and compact character, in which all working parts are positively joined together, detached or loose working parts being eliminated.

These and other objects are achieved by the provision of a joint which in effect comprises two specialized Hooke's joint units of different types and having some parts in common, one inside the other and having a common center, and radius-rod means for maintaining the two units in proper angular relation whatever the angular relation of the driving and driven sides of the joint.

In more detail the joint comprises a block, a shaft (driving or driven) pivotally attached to the block through an axis at right angles to the shaft axis, pivot means in said block at right angles to said two axes, a second shaft (driven or driving), an interrupted annulus mounted on the second shaft symmetrically with respect to the axis thereof, and constructed and arranged to drive said pivot means while allowing free circular movement of the pivot means with respect to the annulus, and lever means fulcrumed with respect to the two shafts and with respect to the block and constructed and arranged to maintain the axis of the pivot means in substantially bisecting relation to the axes of the shafts. In one embodiment of the invention, the lever means includes a lever fulcrumed to a yoke carried by the pivot means, and in another embodiment the lever is fulcrumed in the block itself, and in lieu of the separate yoke a slotted fulcrum guide portion is provided in the block.

In the accompanying drawings there are shown, more or less diagrammatically, two examples of specific embodiments of apparatus within the purview of the invention. In the drawings, Fig. 1 is a view of one embodiment of the joint in central vertical section with some parts shown in elevation, Fig. 2 is a sectional view taken along line 2—2 of Fig. 1, with the cover omitted, Fig. 3 is a view of the joint in side elevation, with the cover omitted, Fig. 4 is a view in central vertical section, with some parts shown in elevation, of a modified form of joint, Fig. 5 is a view in elevation of the block and shoe assemblage of the structure of Fig. 4, Fig. 6 is a view in front elevation of the housing of the structure of Fig. 4, and Fig. 7 is an end view of the block and clevis assemblage of the joint of Fig. 4.

Referring to the drawings, and more particularly to Figs. 1, 2 and 3, the joint is shown applied to two power shafts 10 and 11, one of which (either one) is the driven shaft and the other the driving shaft. In Fig. 1 the shafts are shown as disalined; as making an angle with respect to each other. The joint proper comprises a socketed shaft member or stub shaft 12, fixed to shaft 10 as by a key 13 and retained by a pivot pin 14 set in bores 9 in a hollow block or cross-head 15. The shaft member has a portion of reduced width 16, and the block is correspondingly beveled off at 17, to allow swinging of the shaft member through a substantial angle. The block is bored on each side at 18 along an axis A at right angles to, and intersecting, the axis of pin 14. Each bore has an enlarged flanged portion 19, arranged to receive the flat head 20 of a pin or stub shaft 21. Pin 21 has three sections 22, 23 and 24 of progressively decreasing diameter as shown; section 22 engages bore 18 tightly and the pins are retained from falling out by rounded portion 25 of socket member 12, which makes a light rubbing contact.

The two stub shafts carry a yoke 26 of U-shape as shown and having two identical bores 30 engaging the stub shafts and a centrally disposed bore 31 beveled at 28 and 29 as shown. The two shafts also carry a pair of identical shoes 32 having curved, flanged peripheral portions 34 and bored at 33 for reception of the extremities of the shafts 21.

A housing 35 is provided, having a shank or shaft portion 36 attached by a key 37 to shaft 11, and two curved arms 38, each of which has an inner bearing surface 39 cylindrical about the axis of pin 14 and having a cylindrical groove or track 40 therein, engaging flanged portions 34 of the two shoes. The shoes slide on the track. The outer contour of the housing is spherical as shown. The assemblage of elements 15, 26 and 32 is free to rotate in tracks 40 about the axis of pin 14.

Assuming shaft 11 to be the driving shaft, this shaft rotates housing 35, which in turn rotates the assemblage of elements 15, 26 and 32. The socket member 12 and hence shaft 10 are driven from block 15 through the agency of pin 14.

In order to insure that each shaft 10 and 11 have identical angular velocity during rotation thereof, axis A of assemblages 15, 26, 32 must bisect the angle between axes B and C of the two shafts 10 and 11. This relation is maintained by means of a radius rod 45, having three spherical or ball-like portions 46, 47 and 48, respectively engaging a spherical socket 49 in the end of shaft member 12, yoke-bore 31, and a spherical socket 50 in a cup-shaped plug 51 sliding in a bore 52 in shank portion 36, as shown. The rod is retained in position by a spring 147 engaging the plug as shown. The plug is grooved at 53 for bypassing air around the plug so as to prevent a piston and cylinder damping effect when the joint is running.

By a suitable spacing of the ball portions 46, 47 and 48 on the rod, and a suitable location of the center of socket 49, and of the bore 31, the axis A can be and is maintained in very nearly true bisecting relation with respect to axes B and C, over a reasonably wide angular range: over an angle between shaft axes B and C of 40 degrees or more. The geometry of the rod and socket proportioning is not per se a part of the present invention.

The joint is protected by cover means comprising a spherical-contoured casing composed of two sections 55 and 56 threadedly attached to each other at 57 to permit assembly, and spaced slightly from the arms 38. Section 56 has a flanged portion 58 abutting an annular flange or rim 59 surrounding the armed portion of member 35, as shown. A hemispherical casing 60 is provided having a socket portion 61 surrounding shaft member 12. Annular packing 62 in the casing makes a dust and grease tight joint with member 12. Casing 60 is urged outwardly by a coil spring 63 abutting an annulus 64 on member 12 as shown, and keeps the joint between casing portions 60 and 55 tight. Annular packing 63 is provided at this joint as shown. A lubrication nipple 66 is provided in member 35 as shown.

The joint is very easy to manufacture and assemble, and stands up well in hard service. It can be taken down into its component units in a very short time with ordinary tools. To take down the joint, the cover is taken off and pin 14 is removed. This permits the socket member 12 to be withdrawn, and the assembly 15, 26, 32 to be slipped out. Rod 45 drops out. Pins 21 are short enough to be withdrawn from the inside of the block (15) thereby disengaging the yoke 26. Assembly is carried out just as simply by a reverse procedure. Because of the open character of the joint, and the fact that all load-carrying bearing surfaces are or can be of simple cylindrical contour, lubrication is straightforward and effective. The joint is very light in weight for the torque it will transmit and is thus especially useful in automobile wheel drives. It is ordinarily embodied in steel or steel and brass.

In situations where the joint is required to take care of a relatively small shaft disalinement, say up to about 15 degrees, the housing construction can conveniently be simplified as shown in a modification of the invention illustrated in Figs. 4, 5, 6 and 7. These figures also serve to illustrate a modified form of mechanism for maintaining the working parts of the joint in correct angular relation.

Referring to Figs. 4 to 7, a joint is shown comprising a right-hand shaft member 100 and a left-hand member 101, corresponding to elements 36 and 12 in Fig. 1. Member 100 has a flared base 102, screwed by screws 103 to a cylindrical housing 104, grooved at 105 to receive inserted shoe guides 106 which have flanged, circular races 107 to receive shoes 108, all as shown. The shoes are bored at 109 to fit on stub shafts 110 integral and a block 111. Shaft member 101 is operatively connected to the block by a clevis 112 attached to the shaft member and carrying a cross shaft or pin 113 extending through the block. The pin is keyed to the clevis by Woodruff keys 114 but is free to turn in the block. A spherical cover member 115 apertured at 116 is attached to housing 104 by screws 103, and cooperates with a spherical shield 117 mounted in sliding relation to shaft member 101, with interposed packing 118, and urged against cover 115 by a spring 119, all as shown. Lubrication is effected by a fitting 66 as in Fig. 1.

Pin 113 has a spherical cavity 125 adapted to receive the spherical end 126 of a lever 127 which plays a part like that of lever 45 in Fig. 1. The lever has a second spherical fulcrum portion 128 which is free to move in a slot 129 in block 111, arranged as shown. The right hand end of the lever is carried in a spring-loaded socket member 51 in shaft member 100 just as in Fig. 1.

The lever maintains the axis A of pins 110 in bisecting relation to the shaft axis B and C as in the structure of Figs. 1, 2 and 3. A constant velocity ratio is provided.

The joint of Figs. 4 to 7 is especially simple to construct and to assemble and take down. On removing cover 115 the working parts of the joint can simply be pulled out of housing 104 and taken to pieces.

The modified centering-lever construction shown in Figs. 4, 5 and 7 can be employed in the spherical housing joint of Figs. 1, 2 and 3 if desired, and similarly, the centering-lever and yoke construction of Figs. 1, 2 and 3 can be fitted with a cylindrical housing as in Figs. 4 and 6.

This application is a continuation-in-part of my prior application Serial No. 254,276, filed February 2, 1939, for Universal joints.

What I claim is:

1. A universal joint comprising in combination a rotary shaft member provided with a circular annular track lying in the plane of the shaft member axis and centered on the shaft member axis, a second rotary shaft member, an intermediate torque-transmitting member pivotally attached to said second shaft member in such manner as to rotate the second shaft member upon rotation of the intermediate member but allowing swinging of the second shaft member axis about an axis perpendicular to the axis of said second shaft member, shoe means pivotally attached to said intermediate member along an axis at right angles to the axis of pivotal attachment of the torque-transmitting member and second shaft member, and slidably engaging said circular track and means for maintaining the axis joining said pivoted shoe means in substantially bisecting relation to the angle between the axes of the two shaft members, whereby to provide constant angular velocity ratio between the two shaft members.

2. A universal joint comprising in combination a rotary shaft member having a circular track portion lying in the plane of the shaft member axis of rotation and centered on said axis, a second rotary shaft member, an intermediate torque-transmitting member, pivot means connecting the second shaft member with the torque-transmitting member arranged to permit angular motion of the second shaft member about an axis perpendicular to the axis of said second shaft member, shoe means pivotally attached to said intermediate member and slidably engaging said circular track and means for maintaining the axis joining said shoe means in substantially bisecting relation to the angle between the axes of the two shaft members.

3. A universal joint comprising in combination a block, a shaft member pivotally attached to said block through an axis at right angles to the axis of the shaft member, pivot means on opposite sides of the block, the axis of which pivot means is at right angles to the axis of pivotal attachment of the shaft member and has a common point of intersection with said two axes, a second shaft member having a housing portion provided with an inner circular track lying in the plane of the axis of said second shaft member and centered at said common point of intersection of axes, means for driving said pivot means through the agency of said track, yoke means pivotally engaging said pivot means, and lever rod means fulcrumed at points in said two shaft members and in said yoke means and constructed and arranged to maintain the axis of said pivot means substantially bisecting the angle between the axes of the two shaft members.

4. A universal joint comprising a block, a shaft member pivotally attached to the block through an axis at right angles to the axis of the shaft member, a yoke, pivot means attaching the yoke to the block through an axis at right angles to said axis of attachment of the shaft member, a pair of shoes pivoted to said pivot means, a second shaft member having a C-shaped circular track portion centered about the center of said block and slidably engaging said pair of shoes, and means for maintaining the axis of said pivot means always substantially bisecting the angle between the axes of the two shaft members.

5. A universal joint comprising in combination an open block, a shaft member extending into the opening of the block and pivotally attached thereto through an axis at right angles to the axis of the shaft member, pins protruding from two sides of the block along an axis at right angles to said axis of pivotal attachment of the shaft member, a yoke pivoted on said pins, a pair of shoes pivoted on said pins, a second shaft member having a C-shaped track portion centered about the center of said block and slidably engaging said shoes, and a lever rod fulcrumed at points in said two shaft members adjacent the ends thereof, and at a point in said yoke, and constructed and arranged to maintain the axis of said pins substantially bisecting the angle between the axes of said shaft members.

6. A universal joint comprising in combination a rotary shaft member including a circular track portion lying in the plane of the shaft member axis of rotation and centered on said axis, a second rotary shaft member, an intermediate torque transmitting member, pivot means connecting the second shaft member with the torque transmitting member arranged to permit angular motion of the second shaft member about an axis perpendicular to the axis of said second shaft member, shoe means pivotally attached to said intermediate member and slidably engaging said circular track, a yoke pivotally attached to said intermediate member coaxial with the shoe means, and a lever fulcrumed in the second shaft member, the yoke and the first shaft member, for keeping the axis joining said shoe means in substantially bisecting relation to the angle between the axes of the two shaft members.

7. A universal joint comprising in combination a rotary shaft member including a circular track portion lying in the plane of the shaft member axis of rotation and centered on said axis, a second rotary shaft member, an intermediate torque transmitting member, pivot means connecting the second shaft member with the torque transmitting member arranged to permit angular motion of the second shaft member about an axis perpendicular to the axis of said second shaft member, shoe means pivotally attached to said intermediate member and slidably engaging said circular track, said intermediate member being provided with a slot parallel to the axis of pivotal attachment of the pivot means connecting the intermediate member, and a lever fulcrumed in the end portion of the second shaft member, in said slot, and in the first shaft member, and arranged to keep the axis joining said shoe means in substantially bisecting relation to the angle between the axes of the two shaft members.

DANTE A. SALVETTI.